United States Patent [19]

Borzachillo

[11] Patent Number: 4,729,528

[45] Date of Patent: Mar. 8, 1988

[54] AEROELASTIC CONTROL FLAP

[75] Inventor: Angelo Borzachillo, San Marcos, Calif.

[73] Assignee: Northrop Corporation, Hawthorne, Calif.

[21] Appl. No.: 453,507

[22] Filed: Feb. 28, 1983

[51] Int. Cl.[4] .............................................. B64C 9/04
[52] U.S. Cl. .................................. 244/90 R; 244/214; 244/75 R
[58] Field of Search ............... 244/213, 214, 215, 219, 244/90 R, 87, 75 A, 76 C, 75 R

[56] References Cited

U.S. PATENT DOCUMENTS

| 3,734,432 | 5/1973 | Low | 244/76 C |
| 4,146,200 | 3/1979 | Borzachillo | 244/90 R |
| 4,479,620 | 10/1984 | Rogers et al. | 244/90 R |

FOREIGN PATENT DOCUMENTS 27140 of 1909 United Kingdom ................ 244/215

Primary Examiner—Galen Barefoot
Attorney, Agent, or Firm—Terry J. Anderson; Robert B. Block

[57] ABSTRACT

Auxiliary aeroelastic control flaps arranged on the leading edge of an aircraft's wings at or near the wing tips and ahead of the ailerons for actuation under control of the pilot. The aeroelastic control flaps operate with the ailerons to induce supplementary aerodynamic force to augment the effectiveness of lateral and directional control during high stress manuevers at high dynamic pressures, but do not rely on wing sensors such as accelerometers coupled with a computer for automatic operation.

2 Claims, 5 Drawing Figures

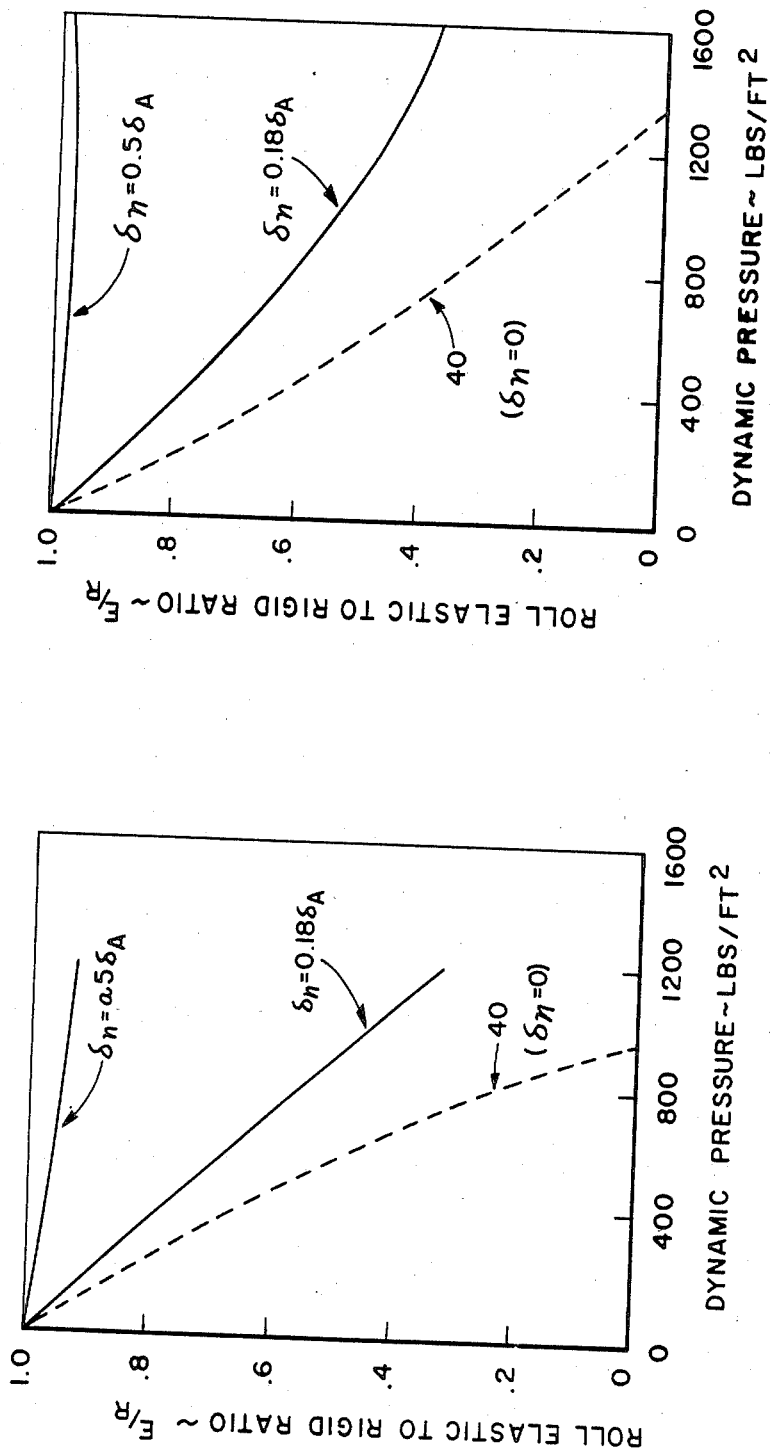

AEROELASTIC CONTROL FLAP

BACKGROUND OF THE INVENTION

1. Field of the Invention

The present invention relates to aircraft flight controls for improving lateral control and roll rate of an aircraft, and more particularly to auxiliary flight control flaps usable in conjunction with an aircraft aileron roll control system to augment lateral or roll control effectiveness at high dynamic pressures.

2. Description of the Prior Art

An aerodynamic problem that has long plagued aviation concerns lateral control of aircraft at transonic speeds and high dynamic pressures. In the lateral control of an aircraft during turn and roll maneuvers, for example, conventional ailerons are employed, and generally are adequate for aircraft employing relatively thick wings. However, the effectiveness of ailerons on aircraft having relatively thin wings is severely reduced or impaired during maneuvers at high dynamic pressures. Moreover, it is well known that supersonic aircraft can suffer control reversal at transonic speeds, which can have an adverse effect on lateral control and rate of roll of the aircraft.

The use of conventional ailerons on thin wing combat aircraft requires additional structural weight in the wings to obtain the rigidity necessary to achieve the required roll rate or time to achieve a given bank angle. A number of devices have been proposed to overcome the problem discussed above, some of which have been, and now are employed on aircraft; such as multiple and single spoilers, spoiler and aileron/flap combinations, all of which impose penalties of one kind or another on the overall efficiency of the wings during normal flight since it is not practicable to maintain aerodynamic smoothness or surface continuity on the wing surfaces with such devices, for normal flight.

In addition, such devices tend to be unduly complex, expensive, and frequently substantially reduce the structural strength of the wings. Also, the more complex devices are subject to malfunction or possible failure.

Contemporary military aircraft designed for sustained supersonic flight requires wings with ultra-thin sections that obviously limit the options available in the use of prior known auxiliary aircraft control devices.

However, improvements have been made in design of auxiliary devices to enable better and more effective control of the aircraft during high stress manuevers, such as rolls. Most modern high speed aircraft are affected by the degree of structural distortion or deformation of the wing and other aircraft components. The interaction of the aerodynamic forces and the structural deformation is termed "aeroelastic effect." Due to this effect, certain aircraft designs must lock out aileron control above certain speeds because the ailerons contribute roll in the "wrong" direction. This phenomenon is known as "aileron reversal." Although current aircraft use leading edge "flap devices," these devices are used as high lift devices to optimize lift-to-drag ratio, but not to reduce structural deformation or twisting at high speeds as occasioned by the flap devices of the present invention.

PRIOR ART STATEMENT

The following patents are cited as the most pertinent prior art of which the applicant is aware:

| U.S. Pat. No. | Name | Date |
|---|---|---|
| 1,890,012 | Alfaro | December 6, 1932 |
| 2,174,542 | Weick | October 3, 1939 |
| 2,522,159 | Billington | September 12, 1950 |
| 2,750,132 | Palmer er al | June 12, 1956 |
| 3,659,811 | Robertson | February 5, 1972 |
| 3,734,432 | Low | May 22, 1973 |
| 4,142,200 | Borzachillo | March 27, 1979 |

U.S. Pat. No. 1,890,012 (Alfaro) discloses spoiler plates positioned fully beyond the wing tips of an aircraft for forming an efficient lift increasing device which does not interfere with efficient rolling control elements, which will be operative throughout a large range of flying attitudes, and such that the yawing moment created by its operation is advantageous. U.S. Pat. No. 2,174,542 (Weick) discloses a pair of retractible ailerons buried in the upper surface of the wings a short distance forwardly of the wing trailing edges and differentially operable in conjunction with a full span split flap. Operation of the combination of the retractible ailerons and split flaps provides a downwardly deflectable wind break or lift increasing device along the trailing edges of the wings.

The control system for combined operation of ailerons and flaps is disclosed in U.S. Pat. No. 2,522,159 (Billington) and simply teaches interconnecting the controls of the ailerons with the flaps for operation as a single pair of movable surfaces that can function either as flaps or as ailerons.

U.S. Pat. No. 2,750,132 (Palmer et al) discloses an aileron and spoiler combination which purports to improve lateral control, and rate of roll, for high speed aircraft, the spoiler being used to decrease wing lift in connection with the use of up aileron to force the wing down and thereby supplement aileron action under conditions where maximum rate of roll is desired, without requiring additional aileron booster forces.

U.S. Pat. No. 3,659,810 (Robertson) discloses a specially shaped wing incorporating so-called flaperons and flaps, in which the droop setting of the flaperons is coordinated with the deflection of the flaps so as to produce nearly maximum lift without excessive drag during takeoff of the aircraft. A modification of the wing leading edges is described for use where the wing profiles are relatively thin.

Prior to the invention of Low resulting in U.S. Pat. No. 3,734,432, many patents were issued and aircraft constructed with leading and trailing edge flaps capable of being used independently to control the forces on a given wing. Low has provided a specific application of control of such flaps for the suppression of flutter. That is, Low describes suppressing torque loads on the wings by proper phasing of each control surface with an automatic control which tends to neutralize undesired wing movements, and may operate to neutralize certain desired manuevers as well.

Althouguh Low teaches selected uses of flaps, the apparatus for flutter suppression, and the concept of gust alleviation and stability augmentation of an aircraft as described in Low have no relationship to improvement of roll performance as herein recited.

U.S. Pat. No. 4,146,200 (Borzachillo) discloses an auxiliary flap control pivotally mounted on the trailing edge of each wing of an aircraft between the outboard control surfaces and the fuselage and in close proximity to the tail of said aircraft; the auxiliary flap controls being operable relative to the outboard control surfaces to induce supplementary aerodynamic forces on the aircraft tail to thereby augment the effectiveness of aircraft lateral and directional control.

The cited patents make no provisions for reducing wing stresses by minimizing aeroelastic effects induced by an aircraft's ailerons during unsymmetrical high stress dynamic pressure aircraft manuevers. The cited patents are relevant only in that they relate to aircraft flight control systems.

While it is possible that more pertinent prior art exists, the Applicant's search is believed to have been conducted with conscientious effort to locate and evaluate the most pertinent prior art available at the time, but not to be construed as a representation that no better art exists.

BRIEF SUMMARY OF THE INVENTION

According to my invention, auxiliary flight control devices in the form of aeroelastic control flaps are for use in conjunction with ailerons of an aircraft aileron roll control system. The aerolastic control flaps are configured substantially as hinged plates or airfoils arranged on the leading edge of aircraft wings at or near the wing tips ahead of the ailerons. Under control of a pilot, these aeroelastic control flaps are capable of being differentially actuated relative to one another and to the ailerons to induce supplementary aerodynamic forces to augment the effectiveness of lateral and directional control during high stress maneuvers at transonic speeds. The aeroelastic control flap is actuated to minimize the aeroelastic effects induced by the ailerons, proximate which the flaps are located. The flaps function to reduce wing stress during unsymmetrical high stress aircraft maneuvers. No major structural or control system redesign is necessary for the aircraft to which the aerolastic control flaps of the present invention are to be applied. Further, the present flaps may be added to an aircraft with mininum wing weight penalty, and at minimum cost.

The aircraft on which the present invention is incorporated is the relatively small light weight fighter-type aircraft. The need for roll control and tight manuevering capability becomes obvious when the function of a fighter aircraft is recognized. In comparison, a relatively large and heavy commercial aircraft is not intended to be maneuvered as a fighter plane, nor is it capable of such high stress maneuvers. Further, the desired lack of structural stiffness in a fighter plane is the reverse of the requirement for such stiffness in the transport type aircraft. Also, the aerolastic control system induces torsional or bending motions to enhance the roll capability of the aircraft rather than to oppose such motions.

Thus, the present invention in static aerolastic control flaps having the specific use for enhancing roll control of an aircraft has been effectively and successfully incorporated on one of the latest and most advanced aircraft. Indeed roll rate increases up to 100% have been obtained with the aircraft during certain maneuvers. The problem was recognized only recently due to other improvements in performance incorporated in and designed for the aircraft.

An object of the invention is to improve roll control of an aircraft by providing auxiliary control surfaces in the form of aeroelastic control flaps.

Another object of the present invention is to provide auxiliary aircraft flight controls to minimize structural deformation of the aircraft's wings such that roll control effectiveness at high speed is improved.

A further object of the invention is to provide auxiliary flight control device which are readily adaptable to the relatively thin wings of aircraft capable of attaining supersonic speeds.

A still further object is to provide an auxiliary flight control device in the leading edge of aircraft wings at or near the wing tip for augmenting the roll control effectiveness of the aircraft.

BRIEF DESCRIPTION OF THE DRAWING

FIGS. 4A and 4B are graphs showing the effect of the "aeroelastic control flap" on roll elastic-to-rigid ratio, at Mach=0.90 and Mach=1.10, respectively.

PREFERRED EMBODIMENT

Figure 1:
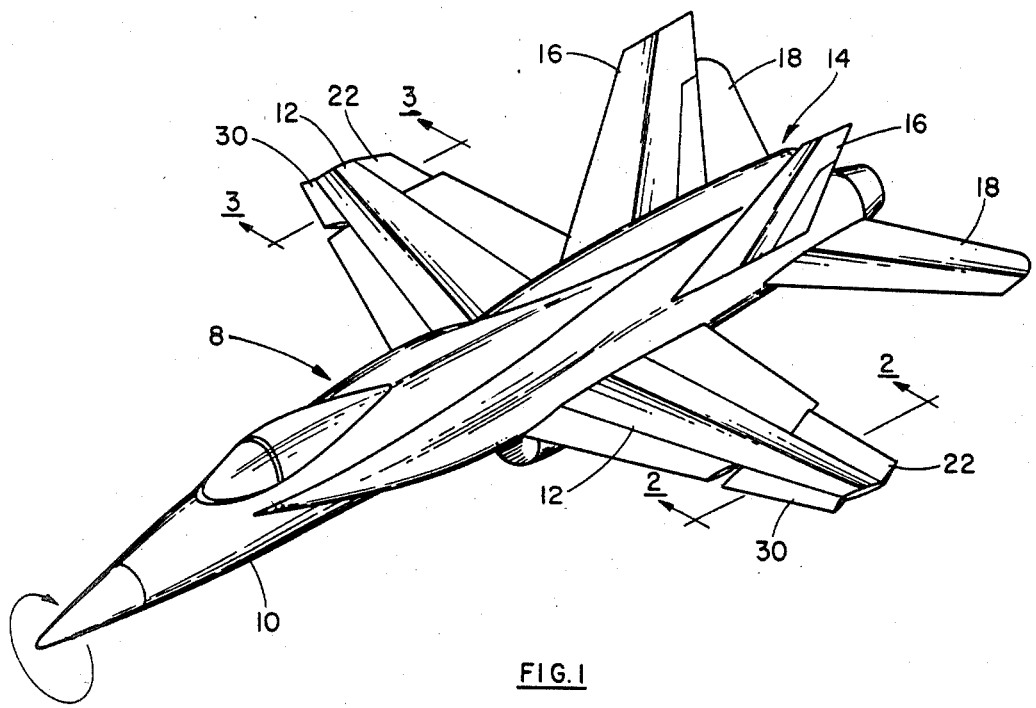
FIG. 1 is a perspective view of an aircraft employing the present invention.
Figure 2:
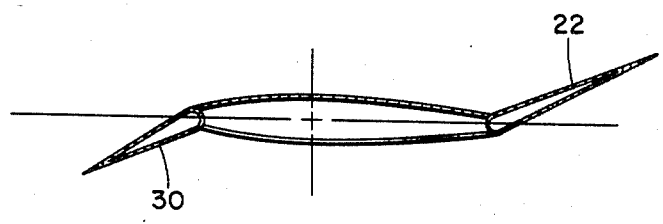
FIG. 2 is a cross-section view taken on section line A—A of FIG. 1.
Figure 3:
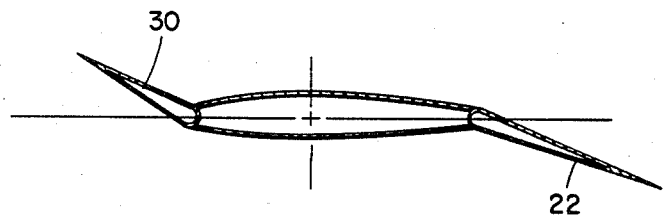
FIG. 3 is a cross-section view taken on section line B—B of FIG. 1.

In FIG. 1, an aircraft 8 is shown including a fuselage 10, swept thin wings 12, and a tail section 14 which, in the present example includes a pair of canted vertical stabilizers or fins 16, and conventional horizontal stabilizers 18. The wings 12 have conventional ailerons 22 mounted on the trailing edge section of each wing. Ailerons 22 operate together for take-off and landing and can operate differentially or in opposition one to the other to cause the aircraft to roll.

To impress an additional increment of lateral control on the aircraft at low angles of attack, at high speeds, and during certain maneuvers, auxiliary flight control devices shown as aeroelastic control flaps 30 are added.

These auxiliary flaps, of a high strength lightweight material, (such as graphite epoxy), are mounted along the forward or leading edge of the wings 12 at or near the wing tips.

Preferably, these auxiliary flaps 30 are in the form of streamlined plates or airfoils shaped to complement the configuration of the wing along the wing section to which the airfoils are attached. The auxiliary flaps 30 are hinged to the wing sections for pivotal movement by conventional mechanical means, not shown. The auxiliary flaps are movable from wing aligned or level position, downwardly or upwardly, individually or together. By control means similar to controls employed to operate ailerons or similar flight control components, the pilot can precisely position the flaps 30 to assist in the desired maneuver of the aircraft. The flaps may be driven by either an independent conventional hydraulic or mechanical system (not shown) or a not shown conventional mechanical linkage to the aileron actuation system, all of which are well known in the art. Also, conventional control logic (not shown) may be used for obtaining predetermined roll control, and to lock out the auxiliary flaps in flight regimes where they are detrimental to roll control.

To induce aerodynamic forces on the aircraft 8, the aeroelastic control flaps 30 are intended to be used in conjunction with the ailerons 22 of the aircraft. A single leading edge flap 30 is mounted on the wings on each side of an aircraft providing the capability of deflecting air flow in any direction with respect to an aileron 22. For maximum effectiveness, the aeroelastic control flaps 30 are located at or near the aircraft wing tip to provide aerodynamic forces that shift the net center of pressure forward thus inhibiting the tendency of the aileron generated forces from twisting the wing in an adverse direction. Hence, roll control of the aircraft, as well as rate of roll, are enhanced.

Aircraft Mach number and angle of attack are important parameters in optimizing the area/chord and the deflection relationship between the aeroelastic control flaps 30 and the wings 12 to which they are attached. The relationship of deflection between the aeroelastic leading edge flap 30 and the aileron 22 depends on the area/chord ratio of each control surface. Roll effectiveness is increased as the deflection ratio of the flap to the aileron increases. The resulting airflow and aerodynamic action minimizes the structural deformation or twist of the aircraft such that roll control and rate of roll are improved.

FIGS. 4A and 4B illustrate the potential roll effectiveness derived from an aeroelastic control flap when used on an aircraft on the class shown schematically in FIG. 1. The graphs illustrate the dramatic improvement possible with the aeroelastic control flaps. Maximum roll performance is attained when the elastic-to-rigid ratio approaches 1.0. Ratios greater than 1.0 are not desirable as they tend to increase the wing loads to unacceptable levels.

In the graphs, the baseline curve 40 assumes the auxiliary flaps are not operating in conjunction with the ailerons. Typically, the ailerons are ineffective at a dynamic pressure greater than 980 lbs/ft$^2$ for Mach 0.9 and 1350 lbs/ft$^2$ for Mach 1.1. When the auxiliary flap is operating the roll effectiveness will be maintained within the aircraft flight envelope. As noted above, the measure of effectiveness will depend on the deflection ratio of the aeroelastic control flap relative to the aileron the higher the ratio, the greater the roll effectiveness.

It will be further understood that the aeroelastic control described herein will provide a beneficial additional increment of aerodynamic force on any aircraft employing a single vertical fin or a V-tail, on aircraft employing a vertical fin or fins without horizontal stabilizers, or on aircraft employing a tall vertical fin with horizontal stabilizers mounted at the upper end of the fin.

Since other variations and modifications within the spirit of the invention may occur to those skilled in the art, the invention may be practiced otherwise than as specifically described above with respect to the preferred embodiment, but within the scope of the appended claims.

I claim:

1. A fighter airplane having a fuselage and wings supported and extending from the fuselage, said wings having leading and trailing edges, said fighter airplane designed for high dynamic pressure producing flight maneuvers, the improvement comprising, in combination, outboard ailerons mounted at the trailing edges of the wings at or near the wing tips for movement up or down with respect to the wing under the control of the pilot, control means operable by the pilot to move said ailerons, outboard aeroelastic control flaps mounted on the leading edge of the wings at or near the wing tips for movement up or down with respect to the wings, said flaps having a lateral extent approximately the same as said ailerons, and control means responsive to pilot demand to move said leading edge control flaps up or down, said control means including control means having inputs including Mach number, angle of attack and dynamic pressure for obtaining programmed roll control to coordinate the leading edge flap movement with the movement of said ailerons to induce supplementary aerodynamic forces on the wings to counteract the effects of aeroelastic wing deformation and thereby increase the roll control effectiveness of said aircraft during high dynamic pressure flight maneuvers and counter aileron reversal.

2. Auxiliary control means for an aircraft as in claim 1, wherein said control means are dimensioned for optimum area/chord ratio relative to said ailerons.

* * * * *